United States Patent Office 3,006,104
Patented Oct. 31, 1961

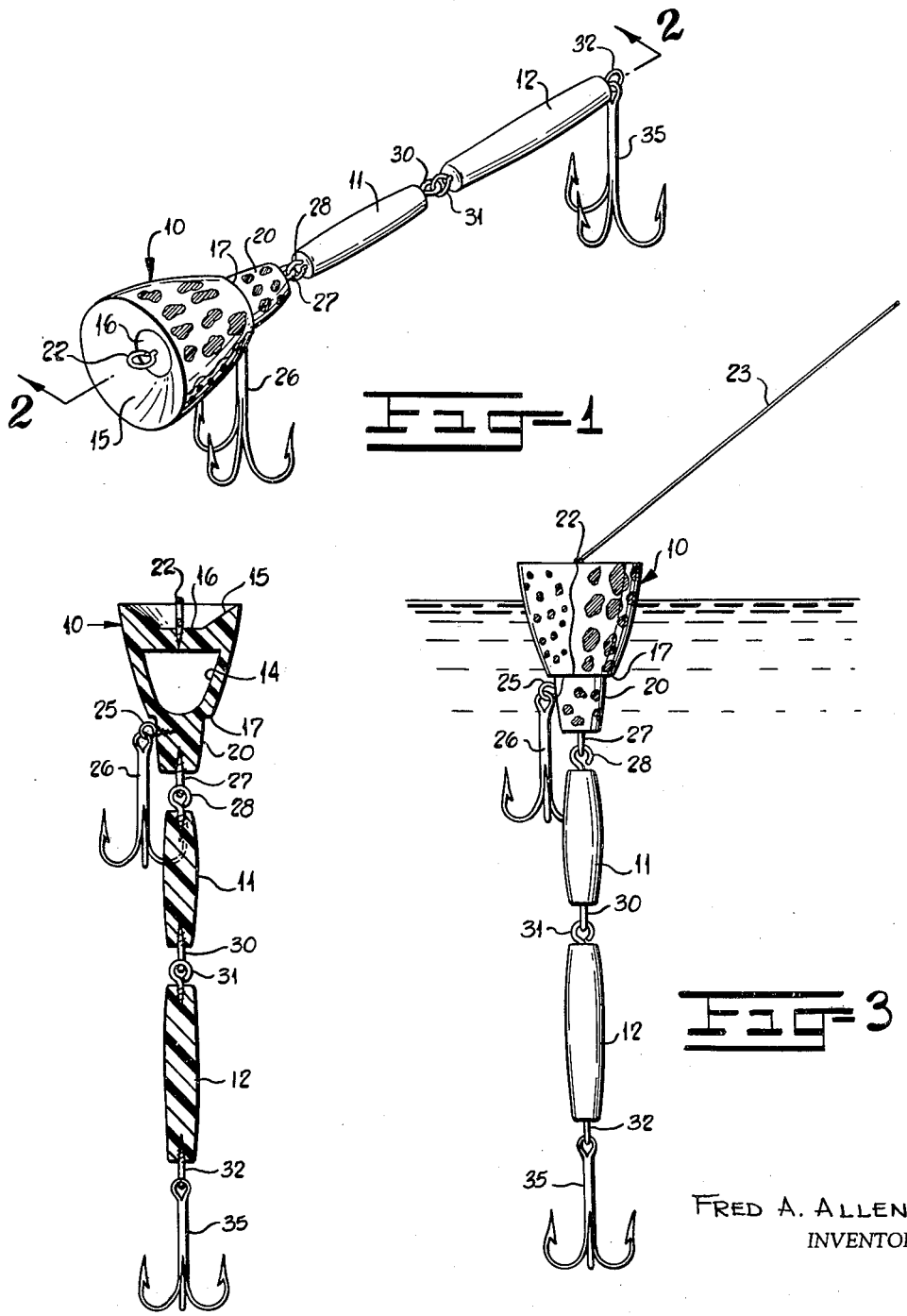

3,006,104
FISH LURE
Fred A. Allen, 189 Smith St., Concord, N.C.
Filed Oct. 23, 1957, Ser. No. 691,822
2 Claims. (Cl. 43—42.15)

The present invention relates generally to a buoyant fish lure and more particularly to a lure which floats in a substantially vertical position and is provided with hook means at various levels to attract and catch fish at different water levels.

As is well known, fish normally feed at different depths in a body of water, depending upon the temperature of the water, the weather and the type of fish. All prior types of fish lures have been provided to operate on the water surface or submerged at a selected depth and many of these lures have diving fins or plates so that the depth may be controlled by the speed at which the lure is retrieved.

It is the primary object of this invention to provide a buoyant fish lure having hook means positioned adjacent the water surface and other hook means positioned at a deeper water level. With the hook means at various water levels, the fish lure will thus attract and catch fish habitating various water levels.

It is another object of this invention to provide a buoyant fish lure adapted to float in a substantially vertical position and having a main body which is buoyant and partially submerged below the water surface. The upper end of the main body is provided with an eye to attach one end of a fishing line and the upper end of the main body is also provided with a concave face normally positioned above the water level. Upon articulation of the line and the lure, the concave face will engage the water to produce a popping noise and attract fish to the lure.

Some of the objects of the invention having been stated, other objects will appear as the description proceeds when taken in connection with the accompanying drawings, in which—

FIGURE 1 is an isometric view of the fish lure;
FIGURE 2 is a longitudinally vertical sectional view taken substantially along the line 2—2 in FIGURE 1;
FIGURE 3 is a view similar to FIGURE 2 but showing the fish lure in elevation, with one end of the fishing line attached thereto and the lure in its normal floating position in the water.

Referring to the drawing, the fish lure comprises a main body or head section broadly indicated at 10 and an elongated tail extending therefrom. The elongated tail is formed by interconnected trailing sections 11 and 12 connected to one end of the head section 10. The head section 10 is substantially circular in cross-section and is shown as being made of a non-buoyant material, such as plastic, with a hollow center 14 to provide buoyancy thereto. The upper end of the head section 10 is provided with a concave surface defined by an inclined wall 15 joined at its lower edge to a flat circular surface 16.

The sides of the head section 10 extend downwardly and converge to a step or shoulder 17 where the head section is reduced in size to provide an auxiliary body or stem 20. While the head section 10 is shown and described as being formed from a non-buoyant material, such as plastic, and is provided with a hollow center to provide buoyancy, it is to be understood that the head section may be formed from a buoyant material, such as cork or the like.

Line receiving means in the form of an eye 22 is suitably secured in the center of the flat circular surface 16 and has one end of a suitable fishing line 23 connected thereto. The other end of the line 23 may be connected to one end of a fishing pole or to the reel of a casting rod.

The auxiliary body or stem 20 of the head section 10 has one end of an eye 25 suitably secured in the side thereto to swivelly support a fish hook 26.

The head section 10 and trailing section 11 are interconnected by interengaged eyes 27 and 28 fixed in the respective sections 10 and 11 to provide a swivel connection therebetween. The trailing sections 11 and 12 are swivelly connected together in a similar manner by eyes 30 and 31 suitably fixed in the trailing sections 11 and 12 respectively. The lower end of the trailing section 12 has one end of an eye 32 fixed therein to swivelly support a fish hook 35.

The trailing sections 11 and 12 are shown and described as being formed of non-buoyant material, such as plastic, so that when the fish lure is placed in the water, as shown in FIGURE 3, the trailing sections 11 and 12 will normally assume a vertical position below the head section 10, substantially as shown. The sections 11 and 12 may be formed of a buoyant material, if desired, as long as the weight of the connecting eyes and hook is sufficient to cause the sections 11 and 12 to assume a vertical position below the head section 10.

The surface of the fish lure may be painted or decorated in any desired manner, such as that illustrated to resemble the markings on a fish, bait or the like. With the lure floating as shown in FIGURE 3, any current or movement of the water or movement of the line 23 will cause the trailing sections 11 and 12 to wiggle or wave and attract the attention of fish in the area.

The depth at which the head section 10 of the fish lure floats in the water may be varied by varying the number of trailing sections used or by varying the weight of the trailing sections 11 and 12. The distance between the upper level hook 26 and the lower level hook 35 may also be varied by varying the number of trailing sections used or by varying the length of the trailing sections 11 and 12.

Thus, a fishing lure has been provided which may easily be cast on a conventional casting rod and reel, or may be used with a line and fishing pole and which lure will normally assume a substantially vertical position with the upper end extending above the surface of the water, when placed in the water, to provide a visual indication when the lure is taken by a fish. The fish lure is also provided with hook means at different levels along its vertical height to thus provide fish ensnaring means at different water levels.

In the drawings and specification there has been set forth a preferred embodiment of the invention and, although specific terms are employed, they are used in a generic and descriptive sense only and not for purposes of limitation, the scope of the invention being defined in the claims.

I claim:
1. A combination surface and submerged fish lure comprising a substantially frusto-conical buoyant head section having a concave depression in its upper end which is substantially normal to its longitudinal axis, and having a reduced depending lower end, said head section assuming a vertical position in the water, a plurality of weighted trailing sections pivotally interconnected and connected at one end to the lower end of said head section and depending in vertical relation from the head section, whereby the fish lure will float in a vertical position with the upper end of the head section above the water level and the trailing sections completely submerged and below said head section, each of said trailing sections being elongated and of less diameter than said head section, first hook means swivelly connected adjacent the lower end of said head section, and second hook means swivelly connected adjacent the free end of said trailing sections whereby the first hook means is disposed adjacent the water surface and the second hook means is spaced from and below said first hook means.

2. A fish lure having a head section and an elongated tail connected to the lower end of the head section, said head section being made of non-buoyant material and comprising an inverted frustum of a cone and a stem of reduced diameter relative to said inverted frustum of a cone integrally joined to the lower end thereof, said inverted frustum of a cone being hollow to provide buoyancy and having a concave depression in its upper end substantially normal to its longitudinal axis, said head section assuming a vertical position in the water with its hollow inverted frustum of a cone being disposed atop the non-buoyant stem in floating relationship, means on said head section to which a fishing line may be attached, a first hook connected to said stem and depending downwardly therefrom, said elongated tail being connected to the lower end of said stem in completely submerged relationship in the water and depending directly beneath said stem in vertical alinement therewith, said elongated tail comprising a plurality of pivotally interconnected non-buoyant trailing sections, a second hook depending from the free end of the lowermost trailing section of said elongated tail substantially beneath said first hook, and said trailing sections wiggling and waving relative to each other and to said head section in response to current movements in the water and pulls on the fishing line to simulate a live object, thereby enhancing the attraction of the lure to fish.

References Cited in the file of this patent

UNITED STATES PATENTS

| | | |
|---|---|---|
| 1,692,935 | Heddon | Nov. 27, 1928 |
| 2,069,972 | Schroeder | Feb. 9, 1937 |
| 2,155,294 | Barnett | Apr. 18, 1939 |
| 2,262,974 | Steiner | Nov. 18, 1941 |
| 2,597,792 | Hardy | May 20, 1952 |
| 2,672,704 | Smith | Mar. 23, 1954 |
| 2,811,805 | McGee | Nov. 5, 1957 |
| 2,923,084 | Hewman | Feb. 2, 1960 |